United States Patent [19]

Oomori et al.

[11] Patent Number: 5,306,136
[45] Date of Patent: Apr. 26, 1994

[54] MOLD CLAMP DRIVING APPARATUS

[75] Inventors: Toshiaki Oomori; Tomiyasu Goto, both of Aichi, Japan

[73] Assignee: Okuma Corporation, Japan

[21] Appl. No.: 27,327

[22] Filed: Jan. 25, 1993

[30] Foreign Application Priority Data

Jan. 25, 1992 [JP] Japan .................. 4-034112

[51] Int. Cl.⁵ .............. B29C 33/26; B29C 45/66
[52] U.S. Cl. .................. 425/593; 74/89.15; 74/106; 100/286; 425/451.6
[58] Field of Search ............. 425/450.1, 451.9, 451.5, 425/451.6, 589, 592, 593, 595; 100/281, 283, 286, 287, 294; 74/89.15, 106

[56] References Cited

U.S. PATENT DOCUMENTS

| | | | |
|---|---|---|---|
| 264,219 | 9/1882 | Bankston | 100/285 |
| 1,353,252 | 9/1920 | Littig | 100/285 |
| 4,360,335 | 11/1982 | West | 425/451.5 |
| 5,164,203 | 11/1992 | Tanaka et al. | 425/593 |
| 5,164,209 | 11/1992 | Goto | 425/451.6 |

FOREIGN PATENT DOCUMENTS 60-122130 6/1985 Japan ............... 425/451.6

*Primary Examiner*—Jay H. Woo
*Assistant Examiner*—Joseph Leyson
*Attorney, Agent, or Firm*—Evenson, McKeown, Edwards & Lenahan

[57] ABSTRACT

In a drive apparatus for a toggle-type mold clamping mechanism of a vertical injection molding machine, a drive motor movably supported on a guide table via rollers moves horizontally following the vertical movement of a ball screw, when a mold is opened or closed, with keeping the distance between the ball screw and the output shaft of the drive motor constant by means of connecting plates. As the ball screw is rotated by the drive motor via a first pulley, a second pulley and a belt wound around the first and second pulleys, a toggle arm of each of a pair of symmetrical toggle clamping mechanisms is bent to close or open the mold.

7 Claims, 5 Drawing Sheets

MOLD CLAMP DRIVING APPARATUS

BACKGROUND OF THE INVENTION

1. Field of the Invention

This invention relates to a drive apparatus for a toggle-type mold clamping mechanism of a vertical injection molding machine.

2. Description of the Related Art:

As shown in FIG. 10 of the accompanying drawings, a typical conventional drive apparatus for a toggle-type mold clamping mechanism of a vertical injection molding machine comprises a pair of toggle mechanisms, each including a pair of links 101, 101 pivotally joined at their inner ends and pivotally connected at their outer ends to a stationary platen 102 and a rear platen 103, respectively, a nut 106 to which the inner ends of the links of one toggle mechanism are connected, a ball screw on which the nut 106 is threadedly mounted, and a motor 107 to which the inner ends of the links of the other toggle mechanism are pivotally connected and which has an output shaft secured to the ball screw. When the distance between the inner ends of the links of one toggle mechanism and those of the links of the other toggle mechanism is varied, mold halves 105 secured to the bottom surface of an upper plate 104 and the top surface of the stationary platen 102, respectively, are opened or closed.

With this conventional drive apparatus for a toggle-type mold clamping mechanism, the motor is attached in an unbalanced manner to the movable parts which move vertically simultaneously with the vertical movement of the upper and rear platens. It is impossible, therefore, to keep the mold-attaching surfaces of the stationary and upper platens parallel to each other due to the weight of the movable parts and due to a deviated load on the movable parts during closing and opening of the mold halves. Further, since the weight of the movable parts becomes increased, it is time-consuming to accelerate and decelerate the motor so that the mold halves can hardly be opened and closed at high speed.

SUMMARY OF THE INVENTION

It is therefore an object of this invention to provide a drive apparatus in which a drive motor is shifted from the movable parts of a mold clamping mechanism so as to keep the mold clamping mechanism free from any deviated load and so as to make the movable parts small in size and weight.

According to the invention, there is provided a toggle-type clamp driving apparatus for pushing a rear platen to close mold halves secured to a lower surface of an upper platen and an upper surface of a stationary platen secured to a bed, the drive apparatus comprising: a pair of horizontally symmetrical toggle mechanisms each including a toggle link pivotally connected at its upper end to the stationary platen, a toggle pivotally connected at its central portion to the rear platen, and an toggle arm bent a its central portion outwardly, a lower end of the toggle link and an upper end of the toggle arm being pivotally connected centrally between the stationary platen and the rear platen; a horizontal screw having a right-handed thread and a left-handed thread concentric of and integral with each other; light-handed-thread and left-handed-thread nuts having the same pitch and threadedly mounted on the right-handed and left-handed threads respectively, each of the light-handed thread and left-handed-thread nuts being pivotally connected to the lower end of the toggle arm of each toggle mechanism; a drive motor mounted on the bed so as to be horizontally movable parallel to and perpendicularly to the screw; means for connecting the drive motor with the screw so as to keep a distance between the axis of a driving shaft of the drive motor and the axis of the screw; rotation transmitting means for transmitting the rotation of the drive motor to the screw; and means for horizontally moving the drive motor following a possible vertical movement of the screw when the mold halves are closed or opened.

In operation, as the screw is rotated by the drive motor, the individual toggle mechanism is bent so that the rear and upper platens interconnected via tie bars move vertically to close and open the mold halves, during which time the drive motor moves horizontally following the vertical movement of the screw, keeping constant the distance between the axis of the output shaft of the drive motor and the axis of the screw. The screw is vertically movable along with the rear platen.

DETAILED DESCRIPTION

Figure 1:
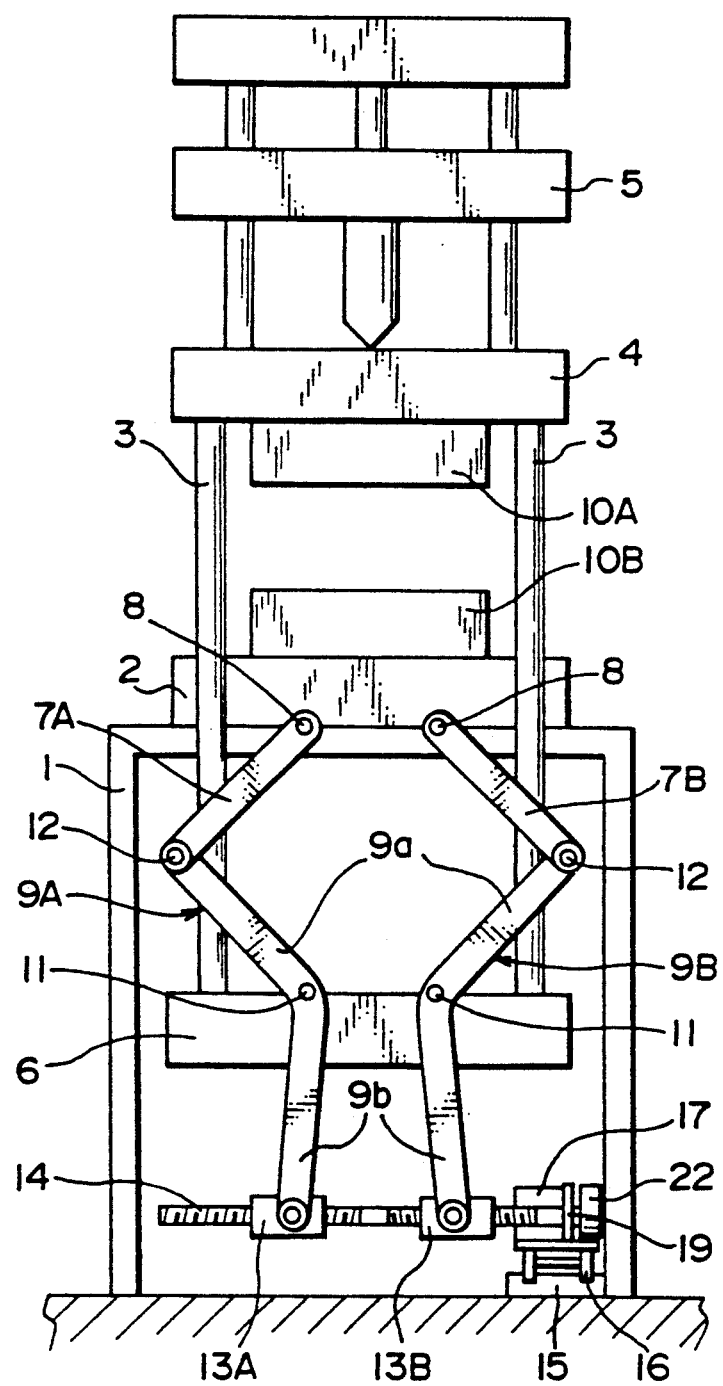
FIG. 1 is a front view of a vertical injection-molding machine equipped with a belt-type drive apparatus according to a first embodiment of this invention.

A drive apparatus, for a toggle-type mold clamping mechanism of a vertical injection molding machine, according to the first embodiment of this invention will now be described with reference to FIGS. 1 through 7.

A stationary platen 2 is horizontally mounted on a top surface of a bed 1 mounted on a floor. The bed 1 has four vertical holes and the stationary platen 2 has four vertical holes axially aligned therewith. An upper platen 4 is horizontally mounted on upper ends of four tie bars 3 and axially movably inserted through the vertical holes. A plasticizing unit 5 is mounted on the upper platen 4, facing downwardly. A rear platen 6 is horizontally attached to lower ends of the tie bars 3. Mold halves 10A, 10B are attached to the bottom surface of the upper platen 4 and the top surface of the stationary platen 2, respectively.

Two toggle links 7A, 7B are symmetrically and pivotally connected at their upper ends centrally to the bottom surface of the stationary platen 2 by pins 8, 8, being spaced apart from each other. Two toggle arms 9A, 9B bent in opposite directions are symmetrically and pivotally connected to the rear platen 6 by pins 11, 11 each located at the meeting point of upper and lower arm portions 9a, 9b of the individual toggle arm 9A, 9B.

The length of the lower arm portion 9b of each toggle arm 9A, 9B is greater than that of the respective upper arm portion 9a. Each toggle link 7A, 7B is pivotally connected at its lower end to the upper end of each toggle arm 9A, 9B by a pin 12 centrally between the stationary platen 2 and the rear platen 6. The toggle mechanism has thus been constructed.

Further, the two toggle arms 9A, 9B are pivotally connected at their lower ends respectively to a left-handed internally threaded nut 13A and a right-handed internally threaded nut 13B. In this embodiment of the axis of each nut 13A, 13B is always kept horizontal. The right-handed internally threaded nut 13A and the left-handed internally threaded nut 13B are threadedly mounted on left-handed and right-handed threads of a horizontal ball screw 14.

Figure 2:
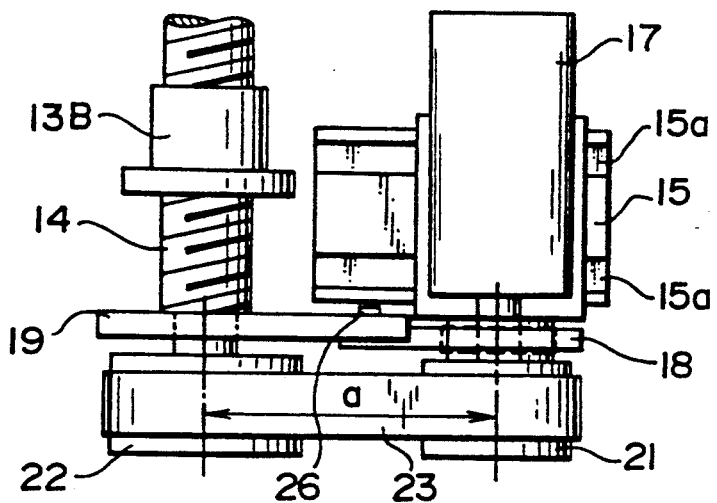
FIG. 2 is a fragmentary enlarged plan view of the belt-type drive apparatus of FIG. 1.
Figure 3:
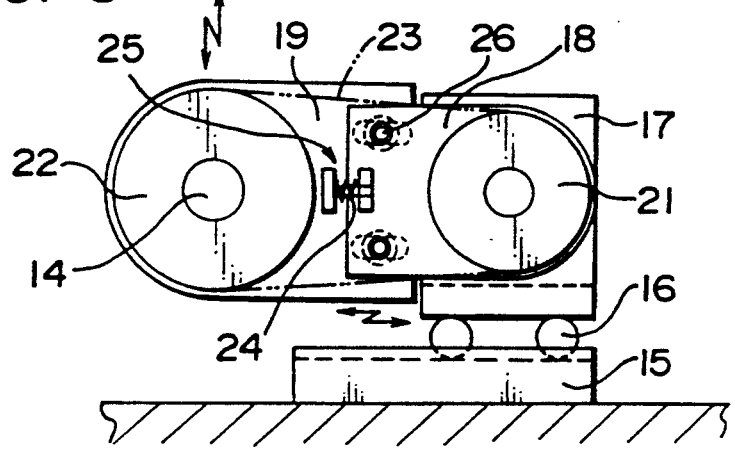
FIG. 3 is a side view of FIG. 2.
Figure 4:
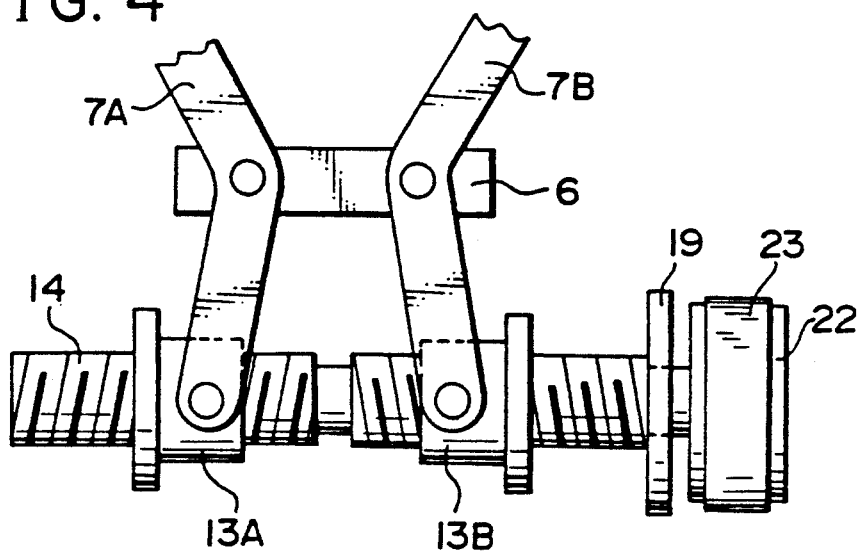
FIG. 4 is a fragmentary enlarged side view of a ball screw shown in FIG. 1.
Figure 7:
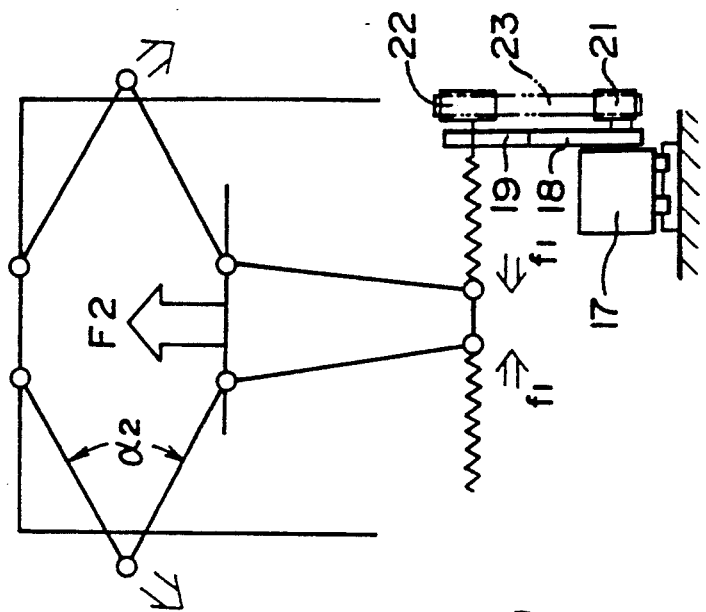
FIGS. 5 through 7 inclusive illustrate the mode of operation of the drive apparatus according to the first embodiment.

Inside the bed 1, a motor guide table 15 is mounted on the floor. The guide table 15 has on its top surface a guide 15a extending perpendicularly to the ball screw 14, as shown in FIG. 2. A drive motor 17 is horizontally movably supported on the guide 15a via rollers 16, as better shown in FIG. 3. The distance "a" (FIG. 2) between the axis of the output shaft of the drive motor 17 and the axis of the ball screw 14 is kept constant by two connecting plates 18, 19. The output shaft of the drive motor 17 and the ball screw 14 are rotatably inserted through the respective connecting plates 18, 19. A synchronous belt 23 is wound around two pulleys 21, 22 mounted on the output shaft of the drive motor 17 and the ball screw 14, respectively. Mounted between the two connecting plates 18, 19 is a tensioner 25 for tensioning the belt 23 under the biasing force of a spring 24; an optimized amount of tension can be obtained simply by unfastening and then refastening two fastening bolts 26, 26.

The operation of the drive apparatus of the first embodiment will now be described.

Figure 5:
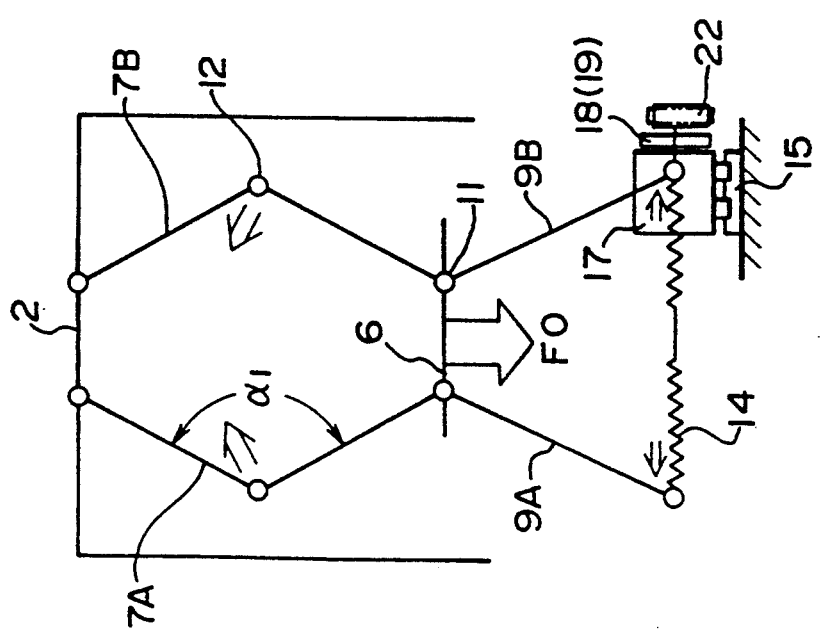

When the ball screw 14 is rotated clockwise (as seen from the pulley side by the drive motor 17 via the pulley 21, the belt 23 and the pulley 22, the nuts 13A, 13B are moved outwardly away from each other to increase the distance therebetween. This increase of the inter-nut distance causes the upper ends of the toggle arms 9A, 9B to angularly move inwardly toward each other about the respective pins 11, 11 to reduce the distance between the pins 12, 12 so that the angle $\alpha 1$ between each toggle link 7A, 7B and each toggle arm 9A, 9B will be progressively increased. As the rear platen 6 is pushed downwardly, the upper platen 4 is lowered via the tie bars 3 to terminate clamping the mold halves, as shown in FIG. 5, at that time the axis of the ball screw 14 and the axis of the output shaft of the motor 17 are located on substantially the same horizontal plane.

Figure 6:
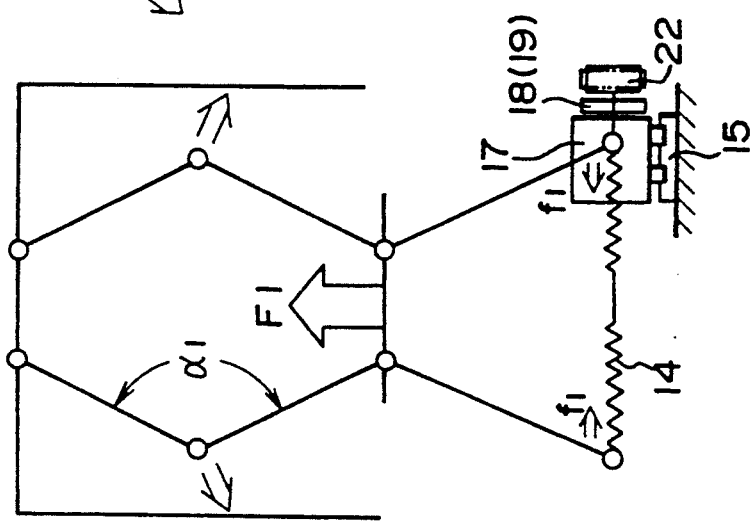

Then when the ball screw 14 is rotated counterclockwise by the drive motor 17 upon termination of the injection process, the nuts 13A, 13B are moved inwardly toward each other to reduce the distance therebetween. This reduction of the inter-nut distance causes the upper ends of the toggle arms 9A, 9B to angularly move outwardly away from each other about the respective pins 11, 11 to increase the distance between the pins 12, 12 so that the angle $\alpha 1$ (FIG. 6) between each toggle link 7A, 7B and each toggle arm 9A, 9B will be reduced to an angle $\alpha 2$ (FIG. 7), thus opening the mold halves 10A, 10B. During this opening of the mold, the ball screw 14 is moved upwardly to cause the drive motor 17 to horizontally move following the vertical movement of the ball screw 14, with the distance a kept constant by the connecting plates 18, 19. During this time, since the plasticizing unit 5 is supported on the upper platen 4, a force greater by the amount of the plasticizing unit 5 is required. To make the force F1, when the angle $\alpha 1$ is great at the beginning of opening the mold as shown in FIG. 6, equal to the force F2, when the angle $\alpha 2$ is small immediately before the termination of opening the mold, a thrust f1 by the ball screw 14 is required to be great. Partly because of the lever ratio of the upper and lower arms 9a, 9b of each toggle arm 9A, 9B and partly because the lower arm 9b will be nearly at a right angle with respect to the direction of thrust of the ball screw 14 as it approaches the end of opening the mold, the thrust f1 will act effectively so that a small-size motor 17 whose torque is relatively small is enough even when the thrust is maximal immediately before opening the mold. Accordingly the force required to move the motor horizontally is very small.

Figure 8:
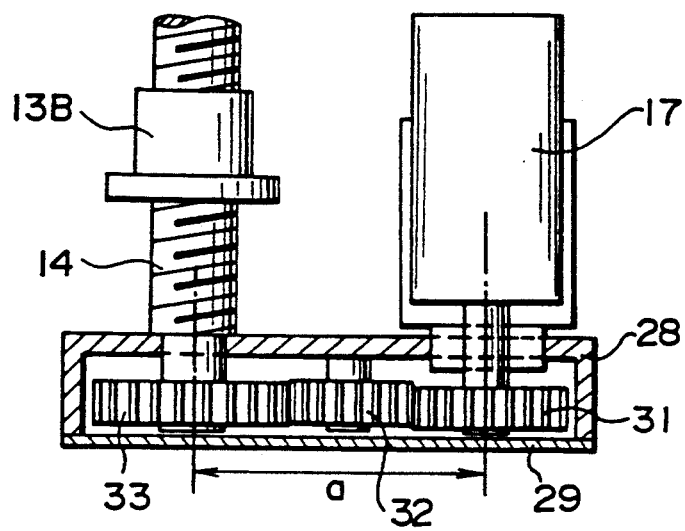
FIG. 8 is a schematic plan view of a gear-type drive apparatus according to a second embodiment.
Figure 9:
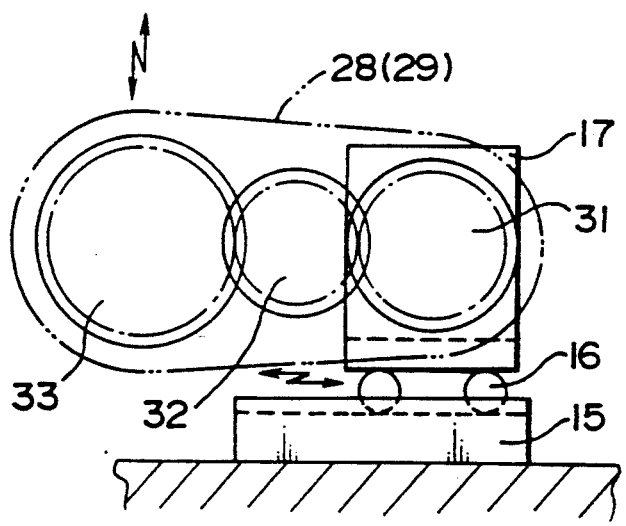
FIG. 9 is a fragmentary enlarged side view of the gear-type drive apparatus of FIG. 8.
Figure 10:
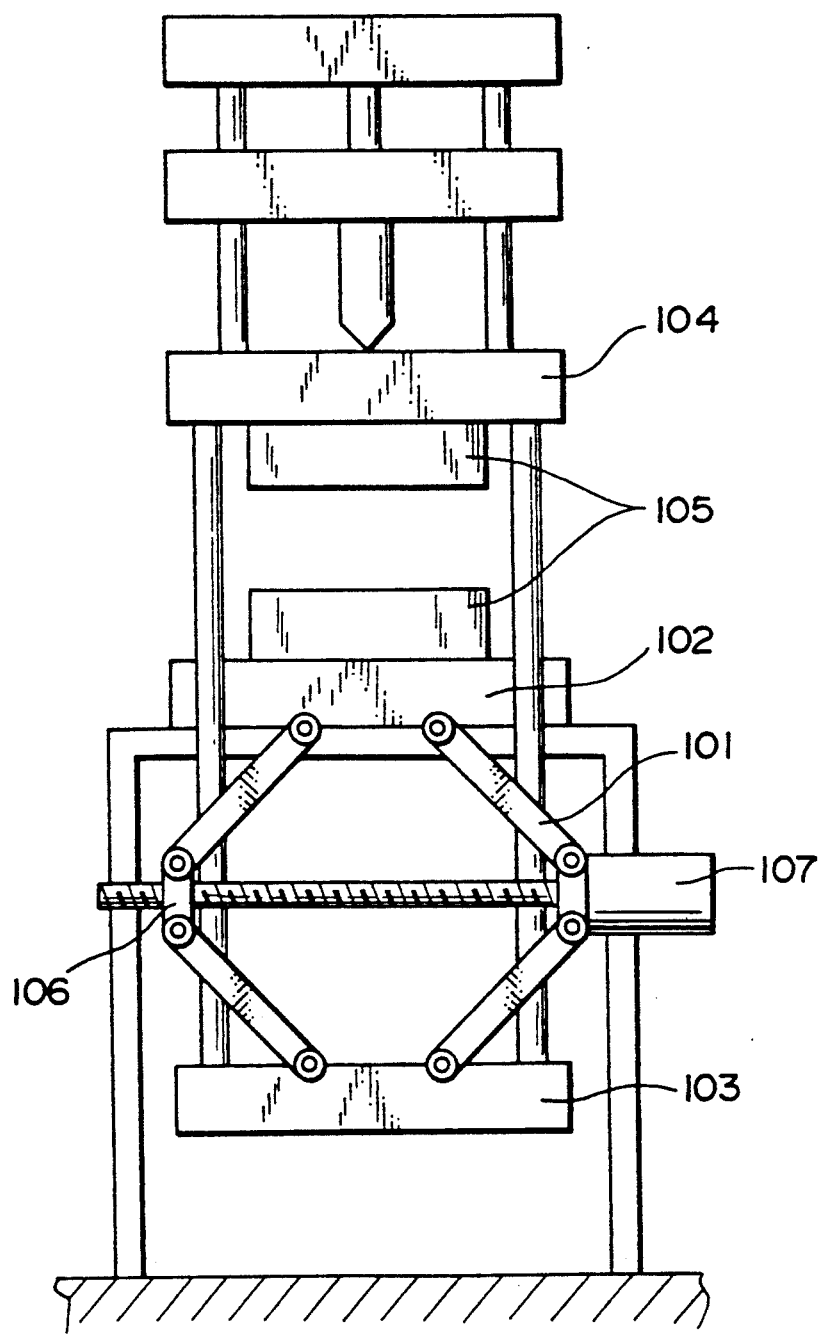
FIG. 10 is a front view of a vertical injection-molding machine equipped with a conventional drive apparatus.

FIGS. 8 and 9 shows a modified drive apparatus according to a second embodiment.

The second embodiment is similar to the first embodiment, except that the rotation of the motor is transmitted to the ball screw 14 by means of gears instead of the belt and pulleys. The parts or elements similar to those of the first embodiment are designated by like reference numerals, and their description is omitted here for clarity.

The distance a between the output shaft of the drive motor 17 and the ball screw 14 is kept constant by a gear case 28 in which the drive motor 17 and the ball screw 14 are rotatably mounted. A closure 29 is secured to the gear case 28. Inside the gear case 28, a first gear 31 mounted on the output shaft of the motor 17 meshes a second gear 33, which is mounted on the ball screw 14, via an intermediate gear 32 rotatably supported by the gear case 28.

In operation, the drive motor 17 is horizontally moved with the distance a kept constant by the gear case 28; since the remaining operation is substantially identical with that of the first embodiment, its description is omitted.

With this arrangement, since the drive motor is supported on a stationary part so as to move horizontally following the vertical movement of the ball screw while opening and closing the mold, it is possible to eliminate any influence of inertia force resulting from the weight of the conventional drive motor, thus preventing the clamping mechanism from flexing due to the deviated load to keep the upper platen parallel to the stationary platen. Further, since the drive motor is mounted separately from the clamping mechanism, it is easy to secure a place for installation of the motor, and to make the clamping mechanism light in weight to increase the opening and closing speed of the mold. Since the drive motor can be installed in a place where it is easy to operate, it is possible to facilitate maintenance.

What is claimed is:

1. A drive apparatus for a toggle-type clamping mechanism having a rear platen, an upper platen associated with the rear platen so as to be movable therewith, and a stationary platen located between the rear platen and the upper platen, in which the rear platen is to be pushed to close mold halves secured to a lower surface of the upper platen and an upper surface of the stationary platen secured to a bed, said drive apparatus comprising:

(a) a pair of symmetrical toggle mechanisms each including a toggle link pivotally connected at its upper end to the stationary platen, a toggle arm pivotally connected at its central portion to the rear platen, the toggle arm being bent at its central portion, a lower end of said toggle link and an upper end of said toggle arm being pivotally connected centrally between the stationary platen and the rear platen;

(b) a horizontal screw having a right-handed thread portion and a left-handed thread portion;

(c) right-handed-thread and left-handed-thread nuts having the same pitch and threadedly mounted on said right-handed and left-handed thread portions, respectively, each of said right-handed-thread and left-handed-thread nuts being pivotally connected to a lower end of said toggle arm of each said toggle mechanisms;

(d) a drive motor mounted on the bed so as to be horizontally movable;

(e) means for connecting said drive motor with said screw so as to keep a constant distance between the axis of an output shaft of said drive motor and the axis of said screw;

(f) rotation transmitting means for transmitting the rotation of the output shaft of said drive motor to said screw; and (g) means for horizontally guiding said drive motor following a vertical movement of said screw when the mold halves are closed or opened.

2. A drive apparatus according to claim 1, wherein said rotation transmitting means includes a first pulley mounted on the output shaft, a second pulley mounted on said screw, and a belt wound around said first and second pulleys.

3. A drive apparatus according to claim 1, wherein said rotation transmitting means includes a gear case through which the output shaft of said drive motor and said screw extend, a first gear mounted on the output shaft of said drive motor in said gear case, a second gear mounted on said screw in said gear case, and an intermediate gear rotatably mounted in said gear case between said first and second gears and meshing said first and second gears.

4. A drive apparatus according to claim 2, wherein said guiding means includes a table having a guide.

5. A drive apparatus according to claim 3, wherein said guiding means includes a table having a guide.

6. A drive apparatus according to claim 2, wherein said connecting means includes first and second connecting plates having respective holes through which the output shaft of said drive motor and said screw are rotatably received.

7. A drive apparatus according to claim 6, further comprising a tensioner mounted between said first and second connecting plates for tensioning said belt.

* * * * *